(12) United States Patent
Daiku et al.

(10) Patent No.: US 7,564,517 B2
(45) Date of Patent: Jul. 21, 2009

(54) SURFACE LIGHT SOURCE AND LIQUID CRYSTAL DISPLAY DEVICE USING THE SAME

(75) Inventors: Yasuhiro Daiku, Iruma (JP); Tetsuo Muto, Hachioji (JP)

(73) Assignee: Casio Computer Co., Ltd., Tokyo (JP)

( * ) Notice: Subject to any disclaimer, the term of this patent is extended or adjusted under 35 U.S.C. 154(b) by 282 days.

(21) Appl. No.: 10/957,858

(22) Filed: Oct. 4, 2004

(65) Prior Publication Data
US 2005/0073625 A1 Apr. 7, 2005

(30) Foreign Application Priority Data
Oct. 6, 2003 (JP) .............................. 2003-347200

(51) Int. Cl.
*G02F 1/1335* (2006.01)
*F21V 7/04* (2006.01)
(52) U.S. Cl. .............................. 349/62; 349/61; 349/65; 362/606; 362/608; 362/610
(58) Field of Classification Search ............. 349/61–65; 362/606–608, 610, 612, 628
See application file for complete search history.

(56) References Cited
U.S. PATENT DOCUMENTS

| | | | | |
|---|---|---|---|---|
| 5,381,309 A | * | 1/1995 | Borchardt | 362/612 |
| 5,704,703 A | * | 1/1998 | Yamada et al. | 362/27 |
| 6,425,673 B1 | * | 7/2002 | Suga et al. | 362/613 |
| 6,827,456 B2 | * | 12/2004 | Parker et al. | 362/629 |
| 2001/0030860 A1 | * | 10/2001 | Kimura et al. | 362/31 |
| 2001/0052955 A1 | * | 12/2001 | Nagatani | 349/65 |
| 2002/0047837 A1 | * | 4/2002 | Suyama et al. | 345/204 |

FOREIGN PATENT DOCUMENTS

| | | | |
|---|---|---|---|
| JP | 02032320 A | * | 2/1990 |
| JP | 3-119889 A | | 5/1991 |
| JP | 7-5455 A | | 1/1995 |
| JP | 10-268230 A | | 10/1998 |
| JP | 2001-066547 A | | 3/2001 |

* cited by examiner

*Primary Examiner*—David Nelms
*Assistant Examiner*—W. Patty Chen
(74) *Attorney, Agent, or Firm*—Frishauf, Holtz, Goodman & Chick, P.C.

(57) ABSTRACT

A surface light source includes a prism sheet placed on one side of a liquid crystal display panel, and having elongated prism portions formed to form a patterned indented entrance surface having an angular cross-section, and an exit surface. A reflecting plate is placed to face the prism sheet through a space. First and second light source units are disposed on two end sides. A control unit sequentially writes left-eye image data and right-eye image data on respective pixels of the display panel, causes the light source unit on the right side when viewed from an observation side of the surface light source to emit light in synchronism with the writing of the left-eye image data, and causes the light source unit on the left side to emit light in synchronism with the writing of the right-eye image data.

16 Claims, 3 Drawing Sheets

SURFACE LIGHT SOURCE AND LIQUID CRYSTAL DISPLAY DEVICE USING THE SAME

CROSS-REFERENCE TO RELATED APPLICATIONS

This application is based upon and claims the benefit of priority from prior Japanese Patent Application No. 2003-347200, filed Oct. 6, 2003, the entire contents of which are incorporated herein by reference.

BACKGROUND OF THE INVENTION

1. Field of the Invention

The present invention relates to a surface light source having directivity in a predetermined direction, a surface light source for displaying a 3D image on a liquid crystal display panel, and a liquid crystal display device including the surface light source.

2. Description of the Related Art

The following is known as a conventional liquid crystal display device designed to display a 3D image. In the device, a left-eye image is displayed by pixels on alternate lines of a liquid crystal display panel, and a right-eye image is displayed by pixels on the remaining alternate lines. The device then allows a display observer to observe the left- and right-eye images by the left and right eyes, respectively, through a lenticular lens which distributes the exit light from the pixels on one line of the liquid crystal display panel and the exit light from pixels on the other line in the left-eye direction and right-eye direction of the observer or a parallax barrier which is formed in a striped pattern by alternately arranging a plurality of light-transmitting portions and light-shielding portions parallel to the pixel lines of the liquid crystal display panel (see Jpn. Pat. Appln. KOKAI Publications No. 3-119889, 7-005455, and No. 10-268230).

The conventional liquid crystal display device designed to display a 3D image displays a left-eye image by the pixels on alternate lines of the liquid crystal display panel, and a right-eye image by the pixels on the remaining alternate lines, and hence the resolution of the two images is low.

In addition, in the conventional liquid crystal display device described above, a lenticular lens with a lens pitch corresponding to the pixel pitch of the liquid crystal display panel or a parallax barrier with a light-transmitting portion pitch corresponding to the pixel pitch must be arranged such that each lens portion or light-transmitting portion accurately corresponds to the pixel on a corresponding line of the liquid crystal display panel in a predetermined positional relationship. This makes it difficult to manufacture the device.

BRIEF SUMMARY OF THE INVENTION

It is an object of the present invention to provide a surface light source having directivity in a specific direction, and a liquid crystal display device which uses the surface light source and has predetermined viewing angle characteristics.

It is another object of the present invention to provide a liquid crystal display device which displays high-resolution 3D images.

A surface light source according to an aspect of the present invention a surface light source comprising: a prism sheet including an entrance surface on which a plurality of triangular elongated prism portions are arrayed parallel to each other to form a patterned indented surface shape with an angular cross-section, and an exit surface from which light entering from the entrance surface exits in a direction; and at least one light source unit which is placed in a direction perpendicular to a longitudinal direction of each of the elongated prism portions of the prism sheet and emits light toward at least one of two ridge surfaces defining an angular ridge of the entrance surface.

This surface light source is designed to make light from one of first and second light source units strike the prism sheet through the space between the reflecting plate and the prism sheet, make the plurality of elongated prism portions on the entrance surface of the prism sheet to refract the light, and cause the light to exit from the exit surface of the prism sheet. The surface light source can make the light from one light source unit exit from the exit surface of the prism sheet as light having directivity, whose exit light intensity peak exists in a direction inclined with respect to the normal to the prism sheet at a predetermined angle in a direction opposite to one light source unit.

In the surface light source according to this aspect, the light source unit preferably includes at least two light sources which applies light to two ridge surfaces defining an angular ridge of the entrance surface of the prism sheet. The surface light source having this arrangement can make light have horizontally or vertically symmetrical directivity.

Preferably, the surface light source according to this aspect further may comprise a reflecting plate which is placed on an entrance surface side of the prism sheet to face thereto through a space through which illumination light from the light source passes, and reflects the illumination light from the light source. With this reflecting plate, more light from the light source can be made to strike the prism sheet, and hence brighter display can be realized.

In the surface light source according to this aspect, the light source unit preferably comprises at least one solid-state light-emitting element, and a light guide plate which is formed from a light scattering transparent member in the form of a rectangular plate having a length substantially equal to that of the plurality of elongated prism portions of the prism sheet, with an entrance surface which light from the solid-state light-emitting element enters being formed on one of two side surfaces extending along a longitudinal direction of the rectangular plate, and an exit surface being formed on the other side surface, is placed on a side of the space between the reflecting plate and the prism sheet with the exit surface facing the space, diffuses light entering from the entrance surface, and causes the light to exit from the exit surface.

Preferably, this surface light source further comprises a reflecting plate which is placed on an entrance surface side of the prism sheet to face thereto through a space through which illumination light from the light source passes, and reflects the illumination light from the light source, and the light source unit comprises at least two light sources which applies light to two ridge surfaces defining an angular ridge of the entrance surface of the prism sheet, and each light source unit comprises at least one solid-state light-emitting element, and a light guide plate which is formed from a light scattering transparent member in the form of a rectangular plate having a length substantially equal to that of the plurality of elongated prism portions of the prism sheet, with an entrance surface which light emitted from the solid-state light-emitting element enters being formed on one of two side surfaces extending along a longitudinal direction of the rectangular plate, and an exit surface being formed on the other side surface, is placed on a side of the space between the reflecting plate and the prism sheet with the exit surface facing the space, diffuses light entering from the entrance surface, and causes the light to exit from the exit surface. With this arrangement, spot light emitted from the solid-state light-emitting elements is diffused by the light guide plate, and the diffused light with a width corresponding to the total length of the plurality of elongated prism portions of the prism sheet is made to enter the space between the reflecting plate and the prism sheet. As a consequence, the first light having directivity, whose exit light intensity peak exists in the first direction and the second light having directivity, whose exit light intensity peak exists in the second direction can be made to exit from the entire exit surface of the prism sheet.

The light guide plate is preferably placed, with one surface being located near the reflecting plate and the other surface having a reflecting film formed thereon.

Preferably, the exit surface of the prism sheet is formed into a flat surface, and the vertical angle of an angular shape of each of the plurality of prism portions formed on the entrance surface of the prism sheet is set within a range of 65° to 75°.

A liquid crystal display device according to another aspect of the present invention a liquid crystal display device comprising: a liquid crystal display element which includes a display area in which a plurality of pixels are arranged in a form of a matrix, and displays an image by controlling transmission of light through the plurality of pixels; a prism sheet which is placed on an opposite side to an observation side of the liquid crystal display element and includes an entrance surface on which a plurality of triangular elongated prism portions are arrayed parallel to each other to form a patterned indented surface shape with an angular cross-section, and an exit surface from which light entering from the entrance surface exits in a predetermined direction; and a surface light source including at least one light source unit which is placed in a direction perpendicular to a longitudinal direction of each of the elongated prism portion of the prism sheet and emits light toward an angular ridge surface of the entrance surface.

In this case, the liquid crystal display element is preferably a homogeneous alignment liquid crystal display element in which a liquid crystal layer with liquid crystal molecules initially aligned into a non-twisted, homogenous aligned state is sealed between a pair of substrates on which opposing electrodes are formed.

In this liquid crystal display device as well, the light source unit is preferably placed on a lower side of the prism sheet which is located outside a portion corresponding to the display area of the liquid crystal display element, and preferably includes at least two light sources which apply light to two ridge surfaces defining an angular ridge of the entrance surface of the prism sheet. Preferably, in addition, the device further comprises a reflecting plate which is placed at a position where the reflecting plate and the entrance surface sandwich the light source to face the entrance surface of the prism sheet through a space through which illumination light from the light source passes, and reflects the illumination light from the light source.

In this liquid crystal display device, the light source unit preferably comprises at least one solid-state light-emitting element, and a light guide plate which is formed from a light scattering transparent member in the form of a rectangular plate having a length substantially equal to that of the plurality of elongated prism portions of the prism sheet, with an entrance surface which light from the solid-state light-emitting element enters being formed on one of two side surfaces extending along a longitudinal direction of the rectangular plate, and an exit surface being formed on the other side surface, is placed on a side of the space between the reflecting plate and the prism sheet with the exit surface facing the space, diffuses light entering from the entrance surface, and causes the light to exit from the exit surface.

A liquid crystal display device according to still another aspect of the present invention a liquid crystal display device comprising: a liquid crystal display element which includes a display area in which a plurality of pixels are arranged in a form of a matrix, makes left-eye image data and right-eye image data to be observed by left and right eyes, respectively, be selectively written on the plurality of pixels, and displays a left-eye image and a right-eye image in accordance with the left-eye image data and the right-eye image data; a surface light source which includes a prism sheet which is placed on an opposite side to an observation side of the liquid crystal display element and includes an entrance surface on which a plurality of triangular elongated prism portions are arrayed parallel to each other to form a patterned indented surface shape with an angular cross-section, and an exit surface from which light entering from the entrance surface exits in a direction, the surface light source including first and second light source units which are placed in a direction perpendicular to a longitudinal direction of each of the elongated prism portions of the prism sheet to emit light toward each ridge surface forming an angular ridge of the entrance surface, and being placed such that a direction perpendicular to the longitudinal direction of the elongated prism portion on the entrance surface of the prism sheet is oriented in a lateral direction of the liquid crystal display panel; and control means for causing one of the first and second light source units of the surface light source to emit light in synchronism with writing of left-eye image data on the plurality of pixels of the liquid crystal display panel, and causing the other light source unit to emit light in synchronism with writing of right-eye image data on the plurality of pixels of the liquid crystal display panel.

In this liquid crystal display device as well, the surface light source preferably includes a reflecting plate which is placed to face the entrance surface of the prism sheet through a space through which illumination light from the light source passes at a position where the reflecting plate and the entrance surface sandwich the light source, and reflects the illumination light from the light source units.

Preferably, in this liquid crystal display device, the first and second light source units of the surface light source respectively include first and second solid-state light-emitting elements, and first and second light guide plates each of which is formed from a light scattering transparent member in the form of a rectangular plate having a length substantially equal to that of the plurality of elongated prism portions of the prism sheet, with an entrance surface which light emitted from the first of second solid-state light-emitting element enters being formed on one of two side surfaces extending along a longitudinal direction of the rectangular plate, and an exit surface being formed on the other side surface, is placed on a side of the space between the reflecting plate and the prism sheet with the exit surface facing the space, diffuses light entering from the entrance surface, and causes the light to exit from the exit surface.

That is, this liquid crystal display device includes the surface light source which is placed on the opposite side to the observation side of the liquid crystal display panel including a display area in which a plurality of pixels are arranged in the form of a matrix, causes light from the first light source unit to exit from the exit surface of the prism sheet as the first light having directivity, whose exit light intensity peak exists in the first direction inclined with respect to the normal to the prism sheet at a predetermined angle in a direction opposite to the first light source unit, and causes light from the second light source unit to exit from the exit surface of the prism sheet as the second light having directivity, whose exit light intensity peak exists in the second direction inclined with respect to the normal to the prism sheet at a predetermined angle in a direction opposite to the second light source unit.

This liquid crystal display device sequentially writes left-eye image data and right-eye image data on the respective pixels of the liquid crystal display panel, and causes the light source unit on the right side of the surface light source (on the right side when viewed from the observation side of the liquid crystal display panel) to emit light in synchronism with the writing of the left-eye image data, thereby making the light exit from the surface light source as light having directivity, whose exit light intensity peak exists in a direction inclined with respect to the normal to the prism sheet to the left side, i.e., the direction of the left eye of the display observer. This device also causes the light source unit on the left side of the surface light source (on the left side when viewed from the observation side of the liquid crystal display panel) to emit light in synchronism with the writing of the right-eye image data, thereby making the light exit from the surface light source as light having directivity, whose exit light intensity peak exists in a direction inclined with respect to the normal to the prism sheet to the right side, i.e., the direction of the right eye of the display observer. The device sequentially displays the left-eye image corresponding to the left-eye image data and the right-eye image corresponding to the right-eye image data on the liquid crystal display panel, thereby allowing the display observer to observe a 3D image.

Preferably, in this liquid crystal display device, the surface light source comprises first and second light source units which selectively emit light of three colors including red, green, and blue, and the control means sequentially selects unit color image data of three colors including red, green, and blue for displaying a left-eye image and unit color image data of three colors including red, green, and blue for displaying a right-eye image in an arbitrary order to sequentially write the data on the respective pixels of the liquid crystal display element during one frame for displaying one 3D image, causes one of the first and second light source units of the surface light source which is located on a right side when viewed from an observation side of the liquid crystal display element to emit light of the three colors including red, green, and blue in synchronism with writing of the unit color image data of the three colors including red, green, and blue for displaying the left-eye image, and causes the light source unit on a left side to emit light of the three colors including red, green, and blue in synchronism with writing of the unit color image data of the three colors including red, green, and blue for displaying the right-eye image.

In addition, in this liquid crystal display device, a plurality of elongated convex lens portions are preferably formed on the exit surface of the prism sheet of the surface light source so as to be parallel to the plurality of elongated prism portions on the entrance surface. In this case, as the liquid crystal display element, a homogeneous alignment liquid crystal display element in which a liquid crystal layer with liquid crystal molecules being initially aligned into a non-twisted, homogenous aligned state is sealed between a pair of substrates on which opposing electrodes are formed is preferably used in terms of the response characteristics of the liquid crystal display element.

The surface light source is designed to make light from one of the first and second light source units strike the prism sheet through the space between the reflecting plate and the prism sheet, make the plurality of elongated prism portions on the entrance surface of the prism sheet to refract the light, and cause the light to exit from the exit surface of the prism sheet. The surface light source can make the light from one light source unit exit from the exit surface of the prism sheet as light having directivity, whose exit light intensity peak exists in a direction inclined with respect to the normal to the prism sheet at a predetermined angle in a direction opposite to one light source unit.

The surface light source makes light from the first light source unit exit from the exit surface of the prism sheet as the first light having directivity, whose exit light intensity peak exists in the first direction inclined with respect to the normal to the prism sheet at a predetermined angle in a direction opposite to the first light source unit, and makes light from the second light source unit exit from the exit surface of the prism sheet as the second light having directivity, whose exit light intensity peak exists in the second direction inclined with respect to the normal to the prism sheet at a predetermined angle in a direction opposite to the second light source unit. Therefore, this surface light source is placed on the opposite side to the observation side of the liquid crystal display panel to form the liquid crystal display device. In this device, the first light having directivity, whose exit light intensity peak exists in the first direction inclined in a direction opposite to the first light source unit with respect to the normal to the prism sheet, i.e., in a direction inclined at a predetermined angle toward the direction of one of the left and right eyes of the display observer and the second light having directivity, whose exit light intensity peak exists in the second direction inclined in a direction opposite to the second light source unit with respect to the normal to the prism sheet, i.e., in a direction inclined at a predetermined angle toward the direction of the other eye of the display observer are made to exit from the surface light source toward the liquid crystal display panel in synchronism with the selective writing of left-eye image data and right-eye image data on the plurality of pixels of the liquid crystal display panel. This makes it possible to sequentially display a left-eye image corresponding to the left-eye image data and a right-eye image corresponding to the right-eye image data on the liquid crystal display panel by using all the pixels of the liquid crystal display panel, thereby allowing the display observer to observe a 3D image.

According to the surface light source, therefore, 3D images with high resolution can be displayed on the liquid crystal display device. In addition, since the surface light source has a simple arrangement comprising the reflecting plate, the prism sheet placed with a space being ensured between itself and the reflecting plate, and the first and second light source units arranged on the two end sides of the space between the reflecting plate and the prism sheet, the above liquid crystal display device can be easily manufactured.

In the above liquid crystal display device, the surface light source is placed on the opposite side to the observation side of the liquid crystal display panel, which has a display area in which a plurality of pixels are arranged in the form of a matrix, such that the exit surface of the prism sheet is made to face the liquid crystal display panel, and a direction perpendicular to the longitudinal direction of the elongated prism portions on the entrance surface of the prism sheet is oriented in the lateral direction of the liquid crystal display panel. The control means causes one of the first and second light source units of the surface light source which is located on the right side when viewed from the observation side of the liquid crystal display panel to emit light in synchronism with the writing of left-eye image data on the plurality of pixels of the liquid crystal display panel, and causes the light source unit on the left side to emit light in synchronism with the writing of right-eye image data on the plurality of pixels of the liquid crystal display panel. This makes it possible to sequentially display a left-eye image corresponding to the left-eye image data and a right-eye image corresponding to the right-eye image data on the liquid crystal display panel by using all the pixels of the liquid crystal display panel, thereby allowing the display observer to observe a 3D image.

This liquid crystal display device can therefore display 3D images with high resolution. In addition, since the surface light source has a simple arrangement, the liquid crystal display device can be easily manufactured.

Preferably, in the above liquid crystal display device, the surface light source comprises first and second light source units which selectively emit light of three colors including red, green, and blue, and the control means sequentially selects unit color image data of three colors including red, green, and blue for displaying a left-eye image and unit color image data of three colors including red, green, and blue for displaying a right-eye image in an arbitrary order to sequentially write the data on the respective pixels of the liquid crystal display element during one frame for displaying one 3D image, causes one of the first and second light source units of the surface light source which is located on a right side when viewed from an observation side of the liquid crystal display element to emit light of the three colors including red, green, and blue in synchronism with writing of the unit color image data of the three colors including red, green, and blue for displaying the left-eye image, and causes the light source unit on a left side to emit light of the three colors including red, green, and blue in synchronism with writing of the unit color image data of the three colors including red, green, and blue for displaying the right-eye image. This makes it possible to display 3D color images with high resolution by field sequential display.

Additional objects and advantages of the present invention will be set forth in the description which follows, and in part will be obvious from the description, or may be learned by practice of the present invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention.

DETAILED DESCRIPTION OF THE INVENTION

Figure 1:
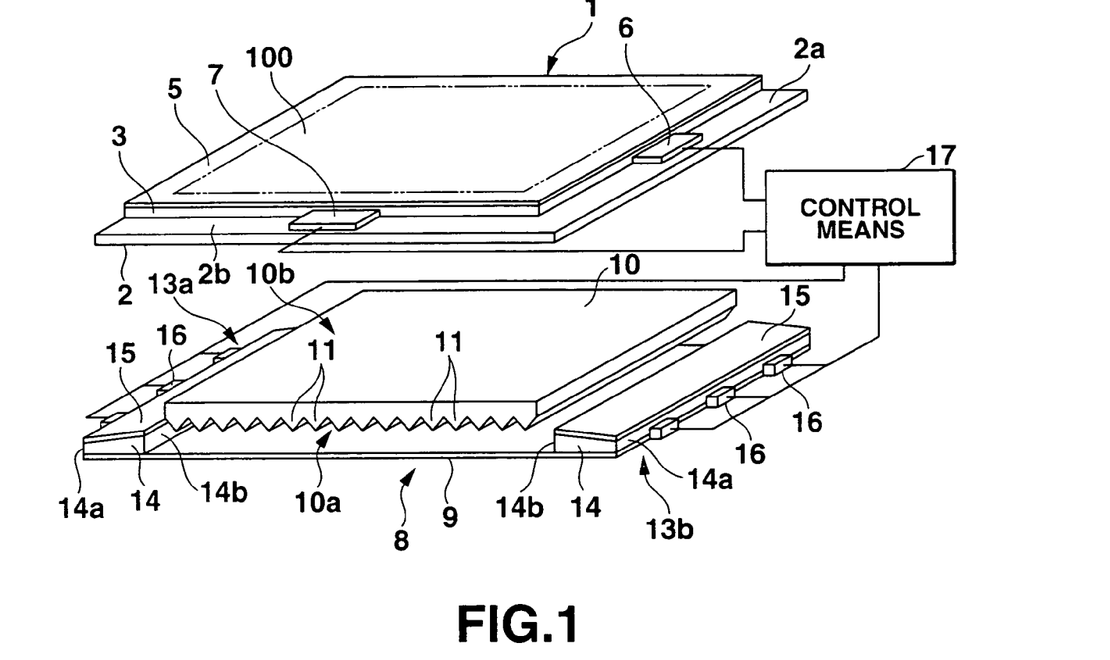
FIG. 1 is an exploded perspective view of a liquid crystal display device according to the first embodiment.
Figure 2:
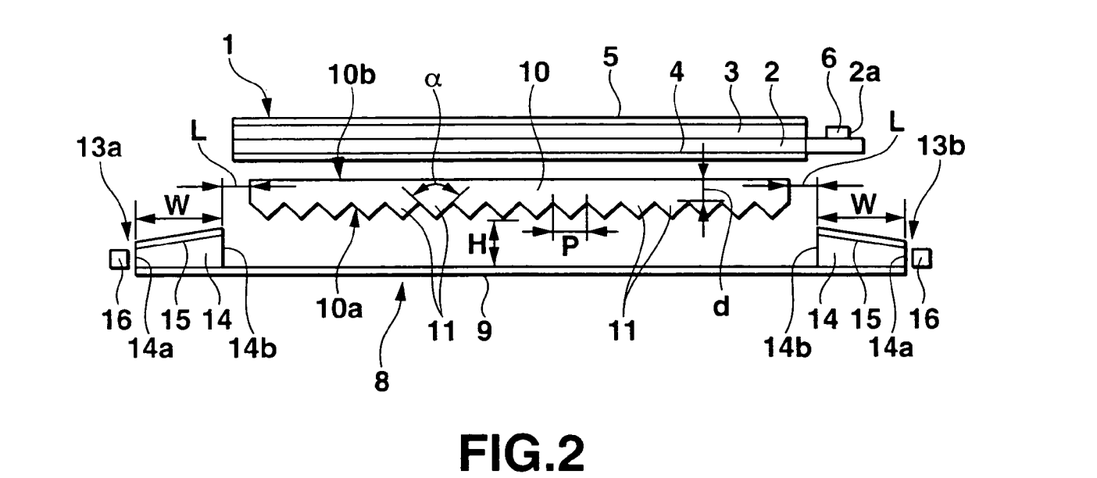
FIG. 2 is a side view of the liquid crystal display device shown in FIG. 1.

FIGS. 1 to 5 show the first embodiment of the present invention. FIG. 1 is an exploded perspective view of a liquid crystal display device. FIG. 2 is a side view of the liquid crystal display device.

As shown in FIGS. 1 and 2, this liquid crystal display device includes a liquid crystal display panel 1 which has a display area 100 in which a plurality of pixels (not shown) are arranged in a form of a matrix, with left- and right-eye image data to be respectively observed by the left and right eyes being selectively written on the plurality of pixels, and selectively displays left- and right-eye images in accordance with the left- and right-eye image data. A surface light source 8 is placed on the opposite side to the observation side of the liquid crystal display panel 1 (the upper side in FIG. 1). A control means 17 drives the liquid crystal display panel 1 and surface light source 8.

The liquid crystal display panel 1 is an active matrix liquid crystal display panel using TFTs (Thin-Film Transistors) as active elements. Although the internal structure of this panel is not shown, a plurality of transparent pixel electrodes arranged in the row and column directions in the form of a matrix, a plurality of TFTs respectively connected to the pixel electrodes, a plurality of gate interconnections which supply gate signals to the TFTs on the respective rows, and a plurality of gate interconnections which supply gate signals to the TFTS on the respective columns are arranged on the inner surface of one of a pair of transparent substrates 2 and 3 joined to each other through a frame-like seal member, e.g., the inner surface of the substrate 2 on the opposite side to the observation side. On the inner surface of the other substrate 3 on the observation side, there is provided a transparent counter electrode in the form of a single film on which a plurality of pixels arranged in the form of a matrix are formed by regions respectively corresponding to the plurality of pixel electrodes. A liquid crystal layer is provided in the region surrounded by the seal member between the substrates 2 and 3. Polarizing plates 4 and 5 are arranged on the outer surfaces of the pair of substrates 2 and 3.

The liquid crystal display panel 1 is, for example, a TN (Twisted Nematic) liquid crystal display panel having liquid crystal molecules of the liquid crystal layer almost twisted/aligned at a twist angle of almost 90° between the pair of substrates 2 and 3 or a non-twisted, homogeneously aligned liquid crystal display panel having the liquid crystal molecules of the liquid crystal layer homogenously aligned such that their long axes are aligned in one direction. The polarizing plates 4, 5 are arranged on the outer surfaces of the substrates 2, 3 such that their transmission axes are almost perpendicular to each other or almost parallel to each other.

Driver-mounted portions 2a and 2b are formed on the substrate 2 on the opposite side to the observation side of the liquid crystal display panel 1 so as to extend from one edge in the row direction and one edge in the column direction and protrude outside the observation-side substrate 3. The plurality of gate interconnections are connected to a gate driver 6 mounted on the driver-mounted portion 2a in the row direction. The plurality of data interconnections are connected to a data driver 7 mounted on the driver-mounted portion 2b in the column direction. The counter electrode is connected to one or both of reference potentials of the gate driver 6 and dataside driver 7 through a cross-connecting portion or portions provided for the substrate joint portion formed from the seal member and counter electrode interconnections formed on or both of the driver-mounted portions 2a and 2b.

The surface light source 8 emits, toward the liquid crystal display panel 1, a first light having directivity, whose exit light intensity peak exists in the first direction inclined with respect to the normal to the liquid crystal display panel 1 at a predetermined angle in the direction of one of the left and right eyes of the display observer, and a second light having directivity, whose exit light intensity peak exists in the second direction inclined with respect to the normal at a predetermined angle in the direction of the other eye of the observer. The surface light source 8 is comprised of a reflecting plate 9, a prism sheet 10 placed to face the reflecting surface (the upper surface in FIG. 1) of the reflecting plate 9, and first and second light source units 13a and 13b.

The reflecting plate 9 of the surface light source 8 is a mirror surface reflecting plate having an area facing an entire display area A of the liquid crystal display panel 1. For example, the reflecting plate 9 is a reflecting plate having almost perfect mirror reflectivity, which is obtained by forming a reflecting film made of silver and having a thickness of 250 nm to 300 nm on a white PET (polyethylene terephthalate) film and forming an anti-corrosive transparent film on the reflecting film.

The prism sheet 10 is designed such that a patterned indented entrance surface 10a having an angular cross-section which is formed by arranging a plurality of elongated prism portions 11, each having an isosceles triangular cross-section, parallel to each other is formed on one surface of a transparent sheet made of acrylic resin and having an area facing the entire display area 100 of the liquid crystal display panel 1, and a flat exit surface 10b from which light entering from the entrance surface 10a exits is formed on the other surface. A thickness d of a portion of the prism sheet 10 except for the plurality of elongated prism portions 11 is about 200 μm, and a vertical angle α of each of the elongated prism portions 11 is set within the range of 65° to 75°.

For the sake of convenience, FIG. 2 shows the plurality of elongated prism portions 11 in an exaggerated form. However, the elongated prism portions 11 are arranged at a pitch P equal to or less than the pixel pitch of the liquid crystal display panel 1. The pitch P of the elongated prism portions 11 falls within the range of 30 μm to 150 μm, and preferably 40 μm to 60 μm.

The prism sheet 10 is placed such that the entrance surface 10a on which the plurality of elongated prism portions 11 are formed faces the reflecting plate 9, and a space is ensured between itself and the reflecting plate 9. A height H of a portion of the space between the reflecting plate 9 and the prism sheet 10 which corresponds to the vertex portion of the elongated prism portion 11 falls within the range of 2 mm to 7 mm, and preferably 4 mm to 6 mm.

The first and second light source units 13a and 13b are arranged on the two end sides of the space between the reflecting plate 9 and the prism sheet 10 in a direction perpendicular to the longitudinal direction of the elongated prism portion 11.

Each of the first and second light source units 13a and 13b is comprised of a light guide plate 14 and a plurality of solid-state light-emitting elements 16. The light guide plate 14 is made of a light scattering transparent material in the form of a rectangular plate having a length almost equal to that of the plurality of elongated prism portions 11 of the prism sheet 10. An entrance surface 14a is formed on one of two side surfaces of this member which extend along its longitudinal direction, and an exit surface 14b is formed on the other side surface. The light guide plate 14 is placed parallel to the elongated prism portion 11, with the exit surface 14b being located on a side of the space between the reflecting plate 9 and the prism sheet 10 so as to face the inside of the space. The light guide plate 14 diffuses light entering from the entrance surface and causes the light to exit from the exit surface. The plurality of solid-state light-emitting elements 16 are arranged to face the entrance surface 14a of the light guide plate 14.

The light guide plate 14 is made of a transparent member such as a transparent resin, for example, acrylic resin in which SiO2 particles or the like with a different refractive index are dispersed. Of the two opposing plate surfaces (the upper and lower surfaces in FIG. 2) of the light guide plate 14, one plate surface is formed into a flat surface, and the other plate surface is formed into an inclined surface which inclines from the entrance surface 14a side to the exit surface 14b side in a direction to separate from one plate surface.

The inclination angle of the inclined surface of the light guide plate 14 (the angle with respect to the flat surface) is 10° or less, and preferably set within the range of 2° to 4°. A width W between the entrance surface 14a and the exit surface 14b is set to 5 mm to 20 mm, and preferably 15 mm to 20 mm. The height of the entrance surface 14a is set to 1 mm to 2 mm. The height of the exit surface 14b is set to 3 mm to 4 mm.

Each of the light guide plates 14 of the first and second light source units 13a and 13b is placed outside the edge of the prism sheet 10 while the flat surface faces the reflecting plate 9 side, and a distance L between the edge of the prism sheet 10 and the exit surface 14b of the light guide plate 14 is set to 2 mm to 10 mm, and preferably 4 mm to 6 mm.

The reflecting plate 9 has protruding portions on its two end portions in a direction perpendicular to the longitudinal direction of the elongated prism portion 11 on the entrance surface 10a of the prism sheet 10. Each protruding portion extends to the mount portion of the light guide plate 14. The flat surface of the light guide plate 14 is bonded on the protruding portion.

A mirror-surface reflecting film 15 having the same structure as that of the reflecting plate 9 is bonded on the entire inclined surface of the light guide plate 14.

The solid-state light-emitting elements 16 are LEDs (Light-Emitting Diodes) molded with a transparent resin. Each solid-state light-emitting element 16 has an exit surface with a height equal to or less than that (1 mm to 2 mm) of the entrance surface 14a of the light guide plate 14, and is placed such that the exit surface faces the entrance surface 14a of the light guide plate 14.

Referring to FIG. 1, the three solid-state light-emitting elements 16 are provided for each of the first and second light source units 13a and 13b. Three solid-state light-emitting elements 16 are arranged at intervals in the longitudinal direction of the light guide plate 14. The number of solid-state light-emitting elements 16 and their configuration intervals on each of the source units 13a and 13b may be set in accordance with the length of the light guide plate 14 such that the light which enters from the entrance surface 14a and is diffused by the light guide plate 14 exits from the entire exit surface 14b of the light guide plate 14 with a uniform luminance distribution.

The surface light source 8 causes light beams from the first and second light source units 13a and 13b to strike two ridge surfaces defining each angular ridge of the entrance surface of the prism sheet 10 through the space between the reflecting plate 9 and the prism sheet 10, makes the plurality of elongated prism portions 11 on the entrance surface 10a of the prism sheet 10 refract the light beams, and makes them exit from the exit surface 10b of the prism sheet 10. The surface light source 8 makes light from the first light source unit 13a exit from the exit surface 10b of the prism sheet 10 as the first light having directivity, whose exit light intensity peak exists in the first direction inclined with respect to the normal to the prism sheet 10 at a predetermined angle in a direction opposite to the light source unit 13a. The surface light source 8 also makes light from the second light source unit 13b exit from the exit surface 10b of the prism sheet 10 as the second light having directivity, whose exit light intensity peak exists in the second direction inclined with respect to the above normal at a predetermined angle in a direction opposite to the light source unit 13b.

Figure 3:
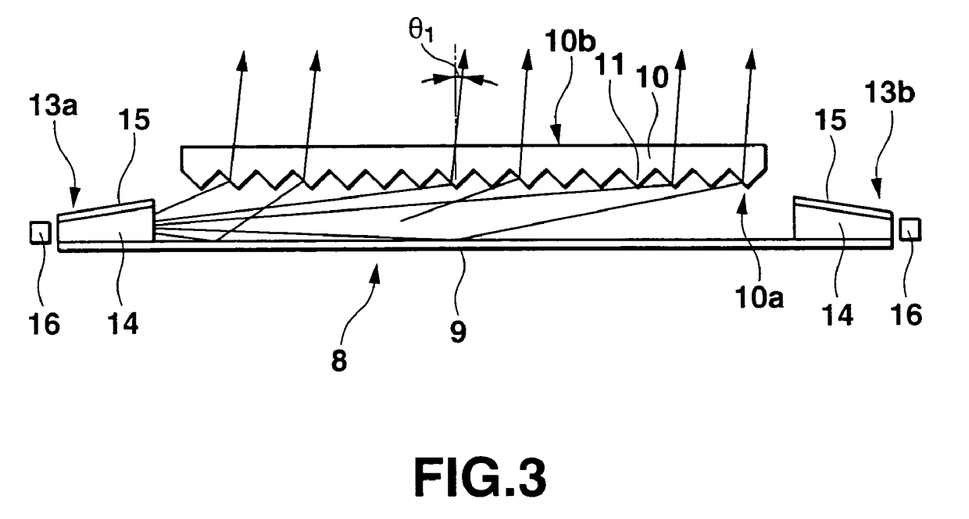
FIG. 3 is a view showing the exit path of the first light from the surface light source of the liquid crystal display device shown in FIG. 1.

FIG. 3 shows the exit path of the first light from the surface light source 8. At this time, the solid-state light-emitting elements 16 of the first light source unit 13a are turned on, and the solid-state light-emitting elements 16 of the second light source unit 13b are turned off.

The light or light rays emitted from the plurality of solid-state light-emitting elements 16 of the first light source unit 13a enter the light guide plate 14 of the first light source unit 13a through the entrance surface 14a and diffused by the light guide plate 14. The diffused light or light rays exit from the entire exit surface 14b of the light guide plate 14, as a beam of a uniform luminance distribution, toward the space between the reflecting plate 9 and the prism sheet 10.

The two opposing plate surfaces of the light guide plate 14 are placed between the protruding portion of the reflecting plate 9 and the mirror-surface reflecting film 15. For this reason, most of light entering the light guide plate 14 through the entrance surface 14a efficiently exits from the entire exit surface 14b.

The plate surface of the light guide plate 14 which is located on the opposite side to the reflecting plate 9 is formed into the inclined surface which inclines from the entrance surface 14a side to the exit surface 14b side in a direction to separate from the plate surface on the reflecting plate 9 side. For this reason, light having strong directivity in a direction slightly inclined with respect to a plane parallel to the reflecting plate 9 toward the prism sheet 10 exits from the entire exit surface 14b.

The light exiting from the exit surface 14b of the light guide plate 14 and entering the space is guided into the space to strike the entrance surface 10a of the prism sheet 10 directly or after being regularly reflected by the reflecting plate 9 as indicated by the arrows in FIG. 3.

As described above, the inclination angle of the inclined surface of the light guide plate 14 is set to 10° or less (preferably 2° to 4°), and the distance L between the edge of the prism sheet 10 and the exit surface 14b of the light guide plate 14 is set to 2 mm to 10 mm (preferably 4 mm to 6 mm). With this setting, of the light exiting from the exit surface 14b of the light guide plate 14 and entering the space, the light or light beam directly entering the prism sheet 10 strikes the entire entrance surface 10a of the prism sheet 10.

As described above, the reflecting plate 9 has almost perfect mirror reflectivity. For this reason, of the light regularly reflected by the reflecting plate 9, the light reflected by the region of the reflecting plate 9 which is located on the first light source unit 13a side with respect to an almost middle position in the longitudinal direction of the reflecting plate 9 (a direction perpendicular to the longitudinal direction of the elongated prism portion 11) strikes almost the entire entrance surface 10a of the prism sheet 10, and the light reflected by a region located on the second light source unit 13b side exits to an external space on the second light source unit 13b side through the space.

That is, the light, of the light exiting from the exit surface 14b of the light guide plate 14 and entering the space, which travels to the entrance surface 10a of the prism sheet 10 and the primary reflected light, of the light regularly reflected by the reflecting plate 9, which is reflected by a region of the reflecting plate 9 which is located on the first light source unit 13a side with respect to an almost middle position of the reflecting plate 9 strike almost the entire entrance surface 10a of the prism sheet 10.

The light striking the entrance surface 10a of the prism sheet 10 is refracted by the interface between an air layer in the space and the side surfaces of the plurality of elongated prism portions 11 on the entrance surface 10a which are located on the first light source unit 13a side in a direction in which the angle with respect to the normal to the prism sheet 10 decreases, and the light enters the prism sheet 10. This light exits from the exit surface 10b of the prism sheet 10 as the first light beam having directivity, whose exit light intensity peak exists in the first direction inclined with respect to the above normal at a predetermined angle $\theta 1$ in a direction opposite to the first light source unit 13a.

Figure 4:
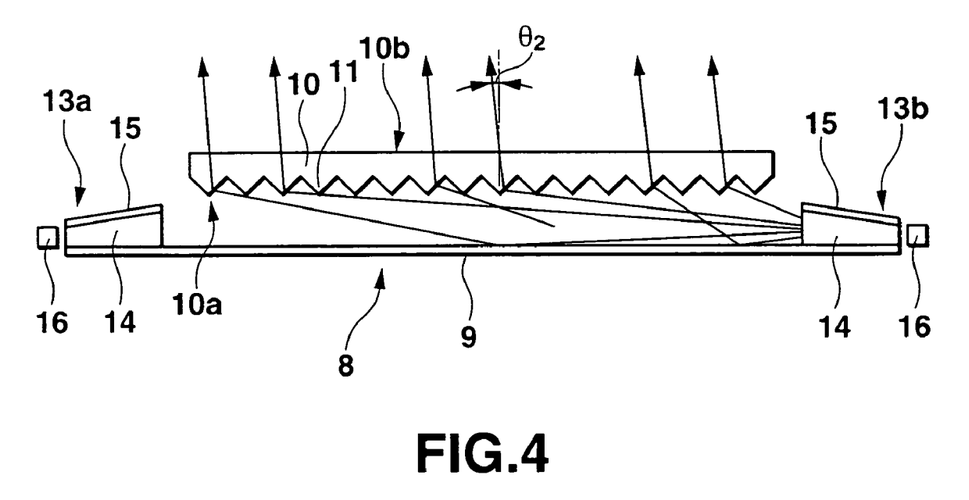
FIG. 4 is a view showing the exit path of the second light from the surface light source.

FIG. 4 shows the exit path of the second light beam from the surface light source 8. At this time, the solid-state light-emitting elements 16 of the second light source unit 13b are turned on, and the solid-state light-emitting elements 16 of the first light source unit 13a are turned off.

The exit path of the second light is symmetric to the exit path of the first light shown in FIG. 3. The light emitted from the solid-state light-emitting elements 16 of the second light source unit 13b enters the light guide plate 14 of the first light source unit 13a through the entrance surface 14a and is diffused by the light guide plate 14. The light then exits from the entire exit surface 14b of the light guide plate 14 with a uniform luminance distribution toward the space between the reflecting plate 9 and the prism sheet 10. The light, of the light entering the space, which travels to the entrance surface 10a of the prism sheet 10 and the primary reflected light, of the light regularly reflected by the reflecting plate 9, which is reflected by a region of the reflecting plate 9 which is located on the second light source unit 13b side with respect to an almost middle position of the reflecting plate 9 strike almost the entire entrance surface 10a of the prism sheet 10.

The light striking the entrance surface 10a of the prism sheet 10 is refracted by the interface between an air layer in the space and the side surfaces of the plurality of elongated prism portions 11 on the entrance surface 10a which are located on the second light source unit 13b side in a direction in which the angle with respect to the normal to the prism sheet 10 decreases, and the light enters the prism sheet 10. This light exits from the exit surface 10b of the prism sheet 10 as the second light having directivity, whose exit light intensity peak exists in the second direction inclined with respect to the above normal at a predetermined angle $\theta 2$ in a direction opposite to the second light source unit 13b.

The exit light intensity peak directions of the first directional light shown in FIG. 3 and second directional light shown in FIG. 4 are mainly determined by the vertical angle $\alpha$ of the plurality of elongated prism portions 11 on the entrance surface 10a of the prism sheet 10, the height H of the portion of the space between the reflecting plate 9 and the prism sheet 10 which corresponds to the vertex portion of the elongated prism portion 11, and the inclination angle of the inclined surfaces (the plate surfaces on the opposite side to the reflecting plate 9) of the light guide plates 14 of the first and second light source units 13a and 13b. Assume that the vertical angle $\alpha$ of the elongated prism portion 11 is set to 70°, the height H of the portion of the space which corresponds to the vertex portion of the elongated prism portion 11 is set to 5 mm, and the inclination angle of the inclined surfaces of the light guide plates 14 of the first and second light source units 13a and 13b is set to 3°. In this case, the first and second directional light beams having exit light intensity peaks in the directions of the angles θ1 and θ2, about 7°, with respect to the normal to the prism sheet 10 can be made to exit.

Figure 5:
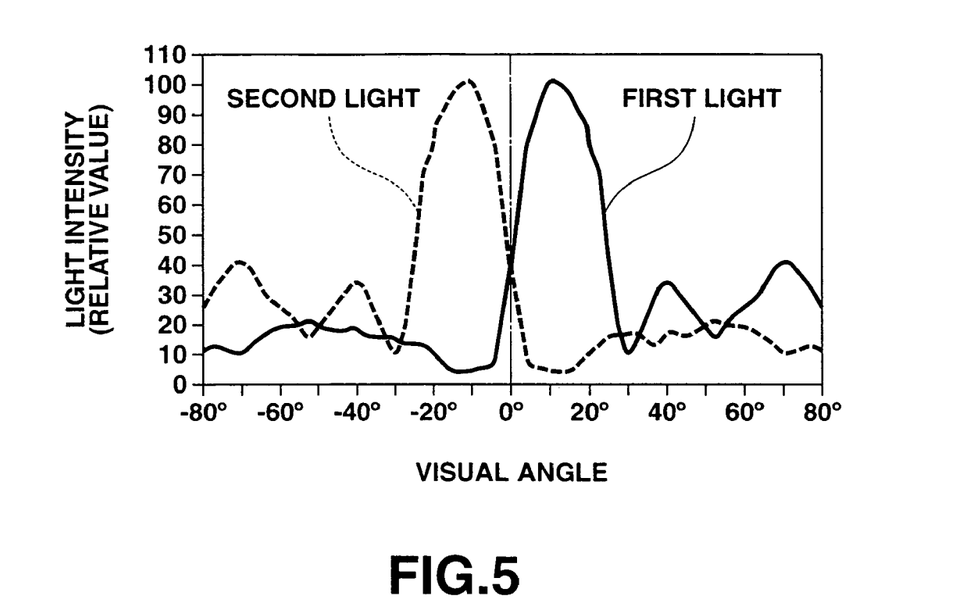
FIG. 5 is a graph showing the intensity distributions of the first light and second light exiting from the surface light source.

FIG. 5 is an intensity distribution graph of the first and second directional light beams exiting from the surface light source 8. Referring to FIG. 5, the visual angle on the abscissa is the observation angle of exit light in a direction perpendicular to the longitudinal direction of the elongated prism portion 11 on the entrance surface 10a of the prism sheet 10 when viewed from the exit side of the surface light source 8 (the observation side of the liquid crystal display panel 1). A positive visual angle is an angle in a direction opposite to the first light source unit 13a with respect to the normal to the prism sheet 10, and a negative visual angle is an angle in a direction opposite to the second light source unit 13b with respect to the normal.

As described above, the surface light source 8 causes the light, of the light rays exiting from the first light source unit 13a and entering the space between the reflecting plate 9 and the prism sheet 10, which travels toward the entrance surface 10a of the prism sheet 10 and the primary reflected light, of the light rays regularly reflected by the reflecting plate 9, which is reflected by a region of the reflecting plate 9 which is located on the first light source unit 13a side with respect to an almost middle position of the reflecting plate 9 to strike the prism sheet 10. The surface light source 8 also causes the light, of the light rays exiting from the second light source unit 13b and entering the space, which travels toward the entrance surface 10a of the prism sheet 10 and the primary reflected light, of the light regularly reflected by the reflecting plate 9, which is reflected by a region of the reflecting plate 9 which is located on the second light source unit 13b side with respect to an almost middle position of the reflecting plate 9 to strike the prism sheet 10. Therefore, as shown in FIG. 5, each of the first and second directional light beams has an intensity distribution in which the intensity of light exiting in a direction opposite to the exit light intensity peak direction of the directional light with respect to the normal to the prism sheet 10 is near 0.

It suffices if the vertical angle α of each of elongated prism portions 11 of the prism sheet 10 falls within the range of 65° to 75°, the height H of the portion of the space between the reflecting plate 9 and the prism sheet 10 which corresponds to the vertex portion of the elongated prism portion 11 falls within the range of 2 mm to 7 mm (preferably 4 mm to 6 mm), and the inclination angle of the inclined surfaces of the light guide plates 14 of the first and second light source units 13a and 13b is 10° or less (2° to 4°). Combining these values within the above ranges can make the first and second directional light beams exit while having exit light intensity peaks in directions of the angles θ1 and θ2, about 7°, with respect to the normal to the prism sheet 10.

The surface light source 8 is therefore placed on the opposite side to the observation side of the liquid crystal display panel 1 to form a liquid crystal display device. In this device, the first light having directivity, whose exit light intensity peak exists in the first direction inclined in a direction opposite to the first light source unit 13a with respect to the normal to the exit surface 10b of the prism sheet 10, i.e., in a direction inclined at a predetermined angle toward the direction of one of the left and right eyes of the display observer and the second light having directivity, whose exit light intensity peak exists in the second direction inclined in a direction opposite to the second light source unit 13b with respect to the normal to the exit surface 10b of the prism sheet 10, i.e., in a direction inclined at a predetermined angle toward the direction of the other eye of the display observer are made to exit from the surface light source 8 toward the liquid crystal display panel 1 in synchronism with selective writing of left-eye image data and right-eye image data on a plurality of pixels of the liquid crystal display panel 1. This makes it possible to sequentially display a left-eye image corresponding to the left-eye image data and a right-eye image corresponding to the right-eye image data on the liquid crystal display panel 1 by using all the pixels of the liquid crystal display panel 1, thereby allowing the display observer to observe a 3D image.

According to the surface light source 8, therefore, 3D images with high resolution can be displayed on the liquid crystal display device. In addition, since the surface light source 8 has a simple arrangement comprising the reflecting plate 9, the prism sheet 10 placed with a space being ensured between itself and the reflecting plate 9, and the first and second light source units 13a and 13b arranged on the two end sides of the space between the reflecting plate 9 and the prism sheet 10, the above liquid crystal display device can be easily manufactured.

In addition, according to the surface light source 8, each of the first and second light source units 13a and 13b is comprised of a light guide plate 14 and a plurality of solid-state light-emitting elements 16. The light guide plate 14 made of a light scattering transparent material in a form of a rectangular plate having a length almost equal to that of the plurality of elongated prism portions 11 of the prism sheet 10. An entrance surface 14a is formed on one of two side surfaces of this member which extend along its longitudinal direction, and an exit surface 14b is formed on the other side surface. The light guide plate 14 is placed parallel to the elongated prism portion 11, with the exit surface 14b being located on a side of the space between the reflecting plate 9 and the prism sheet 10 so as to face the inside of the space. The light guide plate 14 diffuses light rays entering from the entrance surface 14a and causes the light rays to exit from the exit surface 14b. The plurality of solid-state light-emitting elements 16 are arranged to face the entrance surface 14a of the light guide plate 14. This arrangement can cause the first light rays having directivity, whose exit light intensity peak exists in the first direction, and the second light rays having directivity, whose exit light intensity peak exists in the second direction to exit from the entire exit surface 10b of the prism sheet 10 by diffusing point-like light emitted from the solid-state light-emitting elements 16 using the light guide plate 14, and making the light rays with a width corresponding to the total length of the elongated prism portion 11 on the entrance surface 10a of the prism sheet 10 enter the space between the reflecting plate 9 and the prism sheet 10.

Furthermore, in this embodiment, since the exit surface of the prism sheet 10 of the surface light source 8 is formed into a flat surface, and the vertical angle α of the plurality of elongated prism portions 11 on the entrance surface 10a of the prism sheet 10 is set within the range of 65° to 75°, light rays from the first and second light source units 13a and 13b can be effectively made to exit from the exit surface 10b of the prism sheet 10 as the first light rays having directivity, whose exit light intensity peak exists in the first direction, and the second light rays having directivity, whose exit light intensity peak exists in the second direction.

As shown in FIGS. 1 and 2, in the surface light source 8, the exit surface 10b of the prism sheet 10 is placed on the opposite side to the observation side of the liquid crystal display panel 1 so as to face the liquid crystal display panel 1, and the direction of the exit surface 10b which is perpendicular to the longitudinal direction of the elongated prism portion 11 on the entrance surface 10a of the prism sheet 10 is oriented in the lateral direction of the liquid crystal display panel 1.

In this embodiment, in the surface light source 8, the side on which the first light source unit 13a is placed is directed to the right side when viewed from the observation side of the liquid crystal display panel 1, and the side on which the second light source unit 13b is placed is directed to the left side when viewed from the observation side, thereby making light rays from the first light source unit 13a exit from the exit surface 10b of the prism sheet 10 as the first directional light having direction, whose exit light intensity peak exists in the direction of the left eye of the display observer, and also making light rays from the second light source unit 13b exit from the exit surface 10b of the prism sheet 10 as the second directional light having direction, whose exit light intensity peak exists in the direction of the right eye of the display observer.

Assume that in the following description, of the first and second light source units 13a and 13b of the surface light source 8, the first light source unit 13a located on the right side (the left side in FIGS. 1 and 2) when viewed from the observation side of the liquid crystal display panel 1 will be referred to as the left-eye light source unit, and the second light source unit 13b located on the left side (the right side in FIGS. 1 and 2) when viewed from the observation side will be referred to as the right-eye light source unit.

The control means 17 which drives the liquid crystal display panel 1 and surface light source 8 will be described next. The control means 17 of which the detailed arrangement is not shown, comprises a write control circuit which controls the gate driver 6 and data driver 7 of the liquid crystal display panel 1 and an illumination control circuit which controls the emission of light from the first and second light source units 13a and 13b of the surface light source 8.

The control means 17 writes left- and right-eye image data for the observation of images by the left and right eyes on the respective pixels of the liquid crystal display panel 1, and causes the first light source unit, of the first and second light source units 13a and 13b of the surface light source 8, which is located on the right side when viewed from the observation side of the liquid crystal display panel 1, i.e., the left-eye light source unit 13a, to emit light in synchronism with the writing of the left-eye image data, and causes the second light source unit on the left side when viewed from the observation side, i.e., the right-eye light source unit 13b, to emit the right-eye image data in synchronism with the writing of the right-eye image data.

In this embodiment, the solid-state light-emitting elements 16 which selectively emit light or light rays of three colors, i.e., red, green, and blue, are provided for each of the first and second light source units 13a and 13b of the surface light source 8, and the control means 17 is configured to select unit color image data of three colors, i.e., red, green, and blue, for the display of a left-eye image and unit color image data of three colors, i.e., red, green, and blue, for the display of a right-eye image in an arbitrary order during one frame for displaying one 3D image, write the selected data on the respective pixels of the liquid crystal display panel 1, cause the left-eye light source unit 13a on the right side when viewed from the observation side of the liquid crystal display panel 1, of the first and second light source units 13a and 13b of the surface light source 8, to emit the light rays having red, green, and blue components in synchronism with the writing of the unit color image data of three colors, i.e., red, green, and blue, for displaying the left-eye image, and cause the right-eye light source unit 13b on the left side when viewed from the observation side to emit the light rays having red, green, and blue components in synchronism with the writing of the unit color image data of three colors, i.e., red, green, and blue, for displaying the right-eye image.

Although the internal structure of each of the solid-state light-emitting elements 16 of the first and second light source units 13a and 13b of the surface light source 8 is not shown, the solid-state light-emitting element 16 includes a red LED which emits red light rays, a green LED which emits green light rays, and a blue LED which emits blue light rays. These LEDs are selectively driven to selectively emit light rays of three colors, i.e., red, green, and blue.

The unit color image data of three colors, i.e., red, green, and blue, for displaying the left-eye image and the unit color image data of three colors, i.e., red, green, and blue, for displaying the right-eye image are, for example, the image data of the respective color components, i.e., red, green, and blue, sensed by the left lens of a digital camera which has left and right two image sensing lenses spaced at a predetermined distance, and the image data of the respective color components, i.e., red, green, and blue, sensed by the right lens of the digital camera, respectively, of the color image sensed by the digital camera.

According to this liquid crystal display device, the control means 17 selects and writes unit color image data of three colors, i.e., red, green, and blue, for displaying a left-eye image and unit color image data of three colors, i.e., red, green, and blue, for displaying a right-eye image on the respective pixels of the liquid crystal display panel 1 in an arbitrary order during one frame for displaying one 3D image. The control means 17 then controls switching of the solid-state light-emitting elements 16 of the first and second light source units 13a and 13b of the surface light source 8 to cause illumination light having a color and directivity corresponding to the unit color image data written on each pixel of the liquid crystal display panel 1 to exit from the surface light source 8 in synchronism with the writing of the unit color image data, thereby sequentially displaying a total of six unit color images, i.e., a red image, green image, and blue image for the left eye and a red image, green image, and blue image for the right eye, during the one frame in a predetermined order.

That is, this liquid crystal display device is designed to perform field sequential display, i.e., sequentially displaying one of six unit color images, i.e., a left-eye red image, left-eye green image, left-eye blue image, right-eye red image, right-eye green image, and right-eye blue image, in each of six fields constituting one frame for displaying one 3D image in an arbitrary order. This liquid crystal display device displays each of the six unit color images by using all the pixels of the liquid crystal display panel and allows the observer to observe a 3D color image by letting him/her see the six unit color images in a superimposed state. Therefore, the device can display 3D color images with high resolution.

In this liquid crystal display device, one frame and one field are preferably set to 1/30 sec or less and 1/180 sec or less, respectively. This makes it possible to display high-quality 3D color images without any flicker.

In addition, since the surface light source 8 has a simple arrangement as described above, this liquid crystal display device can be easily manufactured.

This liquid crystal display device can field-sequentially display 2D images as well as 3D color images. In this case, unit color image data of red, green, and blue for one of the left and right eyes or unit color image data of red, green, and blue sensed by one image sensing lens may be sequentially written on the respective pixels of the liquid crystal display panel 1, and illumination light beams for the left and right eyes which correspond to the written unit color image data may be made to exit from the surface light source 8.

Figure 6:
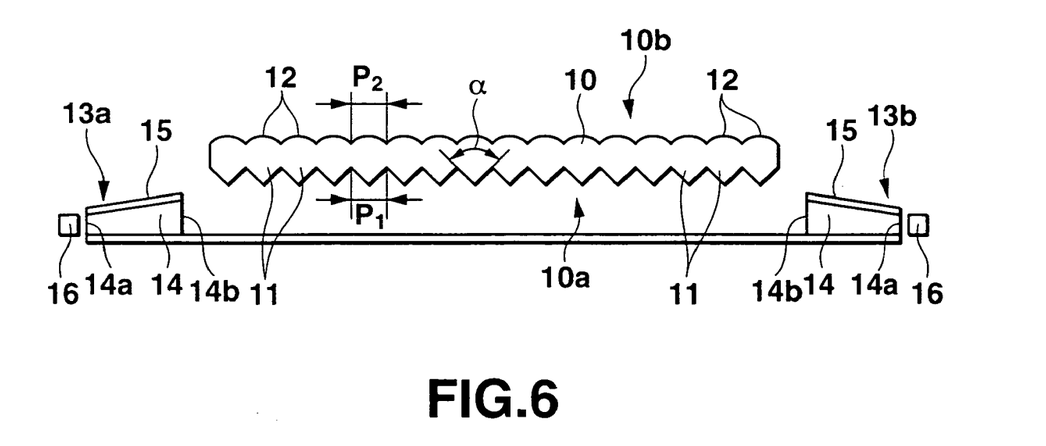
FIG. 6 is a side view of a surface light source according to the second embodiment of the present invention.

FIG. 6 is a side view of a surface light source according to the second embodiment of the present invention. A surface light source 8 of this embodiment is obtained by forming a plurality of elongated convex lens portions 12 on an exit surface 10*b* of a prism sheet 10 so as to be parallel to a plurality of elongated prism portions 11 on an entrance surface 10*a* of the prism sheet 10, with a vertical angle α of the plurality of elongated prism portions 11 being set within the range of 60° to 80°. Pitches P1 and P2 of the plurality of elongated prism portions 11 and the plurality of elongated convex lens portions 12 are set to 30 μm to 150 μm, and preferably 30 μm to 40 μm.

The surface light source 8 of this embodiment is designed such that the plurality of elongated convex lens portions 12 are formed on the exit surface 10*b* of the prism sheet 10, and the vertical angle α of the plurality of elongated prism portions 11 on the entrance surface 10*a* of the prism sheet 10 and the pitches P1 and P2 of the plurality of elongated prism portions 11 and the plurality of elongated convex lens portions 12 are set in the above manner. The remaining arrangements are the same as those in the first embodiment, and a repetitive description will be avoided.

According to the surface light source 8, the plurality of elongated convex lens portions 12 are formed on the exit surface 10*b* of the prism sheet 10 so as to be parallel to the plurality of elongated prism portions 11 on the entrance surface 10*a* of the prism sheet 10. With this arrangement, the exit light intensity peak directions of the first and second directional light beams exiting from the exit surface 10*b* of the prism sheet 10 can be oriented in almost the same direction owing to the light condensing effect of the elongated convex lens portions 12. Therefore, light beams from the first and second light source units 13*a* and 13*b* can be made to more effectively exit from the exit surface 10*b* of the prism sheet 10 as the first light having directivity, whose exit light intensity peak exists in the first direction, and the second light having directivity, whose exit light intensity peak exists in the second direction.

In the surface light source 8, since the vertical angle α of the plurality of elongated prism portions 11 on the entrance surface 10*a* of the prism sheet 10 is set within the range of 60° to 80° as described above, the first and second directional light beams each having an exit light intensity peak in a direction at an angle of about 7° with respect to the normal to the prism sheet 10 can be made to exit.

The surface light source 8 of the first and second embodiments is designed such that the direction in which the exit light intensity peak of each of the first and second directional light beams exists is a direction at an angle of about 7° with respect to the normal to the prism sheet 10. However, the direction in which the exit light intensity peaks of the first and second directional light beams exit may be designed in accordance with the observation distance of display which varies depending on the application of the liquid crystal display device such that the direction in which the intensity peaks of the left-eye illumination light and right-eye illumination light exist coincides with the direction in which the illumination light travels to the left an right eyes of the display observer. The vertical angle α of the plurality of elongated prism portions 11 on the entrance surface 10*a* of the prism sheet 10 or the vertical angle α of the elongated prism portions 11 and the curvature of the elongated convex lens portion 12 on the exit surface 10*b* of the prism sheet 10 may be set in accordance with the above design.

The liquid crystal display device according to the above embodiment using the liquid crystal display panel 1 having no color filter is designed to display 3D color images by field sequential display by providing the surface light source 8 with the left- and right-eye light source units 13*a* and 13*b* which selectively emit light of three colors, i.e., red, green, and blue. However, the present invention can also be applied to a liquid crystal display device in which a liquid crystal display panel includes color filters of a plurality of colors, for example, three colors, i.e., red, green, and blue, corresponding to each of a plurality of pixels of the panel, and the surface light source 8 includes left- and right-eye light source units which emit white light. In this case, left- and right-eye image data may be sequentially written on the respective pixels of the liquid crystal display panel. The left-eye light-emitting elements of the surface light source are then made to emit light in synchronism with the writing of the left-eye image data, and the right-eye light-emitting elements are then made to emit light in synchronism with the writing of the right-eye image data, thereby alternately and sequentially displaying left- and right-eye color images and allowing the observer to observe a 3D image by seeing these images in superimposed state.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A surface light source comprising:

a prism sheet including an entrance surface at which a plurality of triangular elongated prism portions are arrayed parallel to each other, each of the triangular elongated prism portions having a first ridge surface and a second ridge surface which meet at an angle to define an angular ridge, and an exit surface from which light entering from the entrance surface exits; and at least one light source unit which is placed outside of a region on an entrance surface side of the prism sheet, said region corresponding in position to the entrance surface of the prism sheet, so as to provide a space, in said region, in which no solid optical member is provided, wherein the at least one light source unit emits light through the space toward at least one of the first ridge surfaces of the triangular elongated prism portions, and the second ridge surfaces of the triangular elongated prism portions;

wherein the prism sheet includes at least one entrance end surface aligned with at least one boundary of the space, which is a boundary between the space and outside of said region, and wherein the at least one boundary faces the at least one light source unit;

wherein the surface light source further comprises a reflecting plate which has dimensions corresponding to the prism sheet, and is placed at the entrance surface side of the prism sheet to face the entrance surface of the prism sheet through the space through which the light from the light source unit passes, and which reflects the light from the light source unit;

wherein no solid optical member is provided between the prism sheet and the reflecting plate, such that the space in which no solid optical member is provided extends between the prism sheet and the reflecting plate; and wherein each said light source unit comprises:

at least one solid-state light-emitting element, and a rectangular light guide plate which is formed from a light scattering transparent material and has a length substantially equal to a length of said plurality of triangular elongated prism portions;

wherein the light guide plate includes an entrance surface through which light emitted from the solid-state light-emitting element enters as a first one of two side surfaces of the light guide plate that extend along a longitudinal direction of the light guide plate, and an exit surface as a second one of the two side surfaces of the light guide plate that extend along the longitudinal direction of the light guide plate; and wherein the exit surface of the light guide plate is Placed-at a side of and faces the space between the reflecting plate and the prism sheet, and the light guide plate diffuses the light emitted from the at least one solid-state light-emitting element entering from the entrance surface, and causes the light to exit from the exit surface.

2. A light source according to claim 1, wherein the surface light source comprises at least two said light source units, which apply light to the first and second ridge surfaces of the triangular elongated prism portions.

3. A device according to claim 1, wherein the exit surface of the light guide plate has an area that is larger than an area of the entrance surface of the light guide plate.

4. A surface light source comprising:

a prism sheet including an entrance surface at which a plurality of triangular elongated prism portions are arrayed parallel to each other, each of the triangular elongated prism portions having a first ridge surface and a second ridge surface which meet at an angle to define an angular ridge, and an exit surface from which light entering from the entrance surface exits; and at least one light source unit which is placed outside of a region on an entrance surface side of the prism sheet, said region corresponding in position to the entrance surface of the prism sheet, so as to provide a space, in said region, in which no solid optical member is provided, wherein the at least one light source unit emits light through the space toward at least one of the first ridge surfaces of the triangular elongated prism portions, and the second ridge surfaces of the triangular elongated prism portions;

wherein the prism sheet includes at least one entrance end surface aligned with at least one boundary of the space, which is a boundary between the space and outside of said region, and wherein the at least one boundary faces the at least one light source unit;

wherein the surface light source further comprises a reflecting plate which is placed on an entrance surface side of the prism sheet to face the entrance surface of the prism sheet with the space through which the light from the light source unit passes provided between the reflecting plate and the entrance surface, and which reflects the light from the light source unit; and wherein each said light source unit comprises:

at least one solid-state light-emitting element, and a rectangular light guide plate which is formed from a light scattering transparent material and has a length substantially equal to a length of said plurality of triangular elongated prism portions;

wherein the light guide plate includes an entrance surface through which light emitted from the solid-state light-emitting element enters as a first one of two side surfaces of the light guide plate that extend along a longitudinal direction of the light guide plate, and an exit surface as a second one of the two side surfaces of the light guide plate that extend along the longitudinal direction of the light guide plate; and wherein the exit surface of the light guide plate is placed at a side of and faces the space between the reflecting plate and the prism sheet, and the light guide plate diffuses the light emitted from the at least one solid-state light-emitting element entering from the entrance surface, and causes the light to exit from the exit surface.

5. A light source according to claim 4, wherein the light guide plate further includes a surface located on or near the reflecting plate and another surface having a reflecting film formed thereon.

6. A light source according to claim 4, wherein the angle between the first and second ridge surfaces of each of said plurality of triangular elongated prism portions is set within a range of 65° to 75°.

7. A light source according to claim 4, wherein a plurality of elongated convex lens portions are formed at the exit surface of the prism sheet to be parallel to said plurality of triangular elongated prism portions at the entrance surface.

8. A light source according to claim 7, wherein the angle between the first and second ridge surfaces of each of said plurality of triangular elongated prism portions is set within a range of 60° to 80°.

9. A light source according to claim 4, wherein the surface light source comprises at least two said light source units, which apply light to the first and second ridge surfaces of the triangular elongated prism portions.

10. A liquid crystal display device comprising:

a liquid crystal display element which includes a display area in which a plurality of pixels are arranged in a matrix, and which displays an image by controlling transmission of light through said plurality of pixels;

a prism sheet which is placed on a side of the liquid crystal display element opposite to an observation side of the liquid crystal display element, and which includes: (i) an entrance surface at which a plurality of triangular elongated prism portions are arrayed parallel to each other, each of the triangular elongated prism portions having a first ridge surface and a second ridge surface which meet at an angle to define an angular ridge, and (ii) an exit surface from which light entering from the entrance surface exits; and at least one light source unit which is placed outside of a region on an entrance surface side of the prism sheet, said region corresponding in position to the entrance surface of the prism sheet, so as to provide a space, in said region, in which no solid optical member is provided, wherein the at least one light source unit emits light through the space toward at least one of the first ridge surfaces of the triangular elongated prism portions, and the second ridge surfaces of the triangular elongated prism portions;

wherein the prism sheet includes at least one entrance end surface aligned with at least one boundary of the space, which is a boundary between the space and outside of said region, and wherein the at least one boundary faces the at least one light source unit;

wherein the liquid crystal display device further comprises a reflecting plate which has dimensions corresponding to the prism sheet, and is placed at the entrance surface side of the prism sheet to face the entrance surface of the prism sheet through the space through which the light from the light source unit passes, and which reflects the light from the light source unit;

wherein no solid optical member is provided between the prism sheet and the reflecting plate, such that the space in which no solid optical member is provided extends between the prism sheet and the reflecting plate; and wherein each said light source unit comprises:
at least one solid-state light-emitting element, and
a rectangular light guide plate which is formed from a light scattering transparent material and has a length substantially equal to a length of said plurality of triangular elongated prism portions;
wherein the light guide plate includes an entrance surface through which light emitted from the solid-state light-emitting element enters as a first one of two side surfaces of the light guide plate that extend along a longitudinal direction of the light guide plate, and an exit surface as a second one of the two side surfaces of the light guide plate that extend along the longitudinal direction of the light guide plate; and
wherein the exit surface of the light guide plate is placed at a side of and faces the space between the reflecting plate and the prism sheet, and the light guide plate diffuses the light emitted from the at least one solid-state light-emitting element entering from the entrance surface, and causes the light to exit from the exit surface.

11. A device according to claim 10, wherein the liquid crystal display element includes a homogeneous alignment liquid crystal display element in which a liquid crystal layer with liquid crystal molecules initially aligned into a non-twisted, homogenous aligned state is sealed between a pair of substrates on which opposing electrodes are formed.

12. A device according to claim 10, wherein the device comprises at least two said light source units, which apply light to the first and second ridge surfaces of the triangular elongated prism portions; and
wherein each said light source unit is placed at a lower side of the prism sheet and is located outside the display area of the liquid crystal display element.

13. A liquid crystal display device comprising:
(i) a liquid crystal display element which includes a display area in which a plurality of pixels are arranged in matrix, which causes left-eye image data and right-eye image data, to be observed by left and right eyes, respectively, to be selectively written on said plurality of pixels, and which displays a left-eye image and a right-eye image in accordance with the left-eye image data and the right-eye image data;
(ii) a surface light source, which comprises:
a prism sheet which is placed on a side of the liquid crystal display element opposite to an observation side of the liquid crystal display element, and which includes: (i) an entrance surface at which a plurality of triangular elongated prism portions are arrayed parallel to each other, each of the triangular elongated prism portions having a first ridge surface and a second ridge surface which meet at an angle to define an angular ridge, and (ii) an exit surface from which light entering from the entrance surface exits; and
first and second light source units which are placed outside of a region on an entrance surface side of the prism sheet, said region corresponding in position to the entrance surface of the prism sheet, so as to provide a space, in said region, in which no solid optical element is provided, wherein the first and second light source units emit light through the space toward the first and second ridge surfaces of the triangular elongated prism portions;
wherein the prism sheet includes at least one entrance end surface aligned with at least one boundary of the space, which is a boundary between the space and outside of said region, and wherein the at least one boundary faces at least one of the light source units; and
(iii) control means for causing one of the first and second light source units of the surface light source to emit light in synchronism with writing of left-eye image data on said plurality of pixels of the liquid crystal display element, and for causing the other one of the first and second light source units to emit light in synchronism with writing of right-eye image data on said plurality of pixels of the liquid crystal display element;
wherein the surface light source further comprises a reflecting plate which has dimensions corresponding to the prism sheet, and is placed at the entrance surface side of the prism sheet to face the entrance surface of the prism sheet through the space through which the light from the light source units passes, and which reflects the light from the first and second light source units;
wherein no solid optical member is provided between the prism sheet and the reflecting plate, such that the space in which no solid optical member is provided extends between the prism sheet and the reflecting plate; and
wherein each of the first and second light source units of the surface light source respectively comprises:
at least one solid-state light-emitting element; and
a rectangular light guide plate which is formed from a light scattering transparent material member having a length substantially equal to a length of said plurality of triangular elongated prism portions;
wherein the light guide plate includes an entrance surface through which light emitted from the solid-state light-emitting element enters as a first one of two side surfaces of the light guide plate that extend along a longitudinal direction of the light guide plate, and an exit surface as a second one of the two side surface of the light guide plate that extend along the longitudinal direction of the light guide plate; and
wherein the exit surface of the light guide plate is placed at a side of and faces the space between the reflecting plate and the prism sheet, and the light guide plate diffuses the light emitted from the at least one solid-state light-emitting element entering from the entrance surface, and causes the light to exit from the exit surface.

14. A device according to claim 13, wherein the first and second light source units selectively emit light of red, green, and blue, and the control means: (i) sequentially selects unit color image data of red, green, and blue for displaying a left-eye image and unit color image data of red, green, and blue for displaying a right-eye image in an arbitrary order to sequentially write the selected unit color image data on the pixels of the liquid crystal display element during one frame for displaying one 3D image, (ii) causes one of the first and second light source units of the surface light source which is located on a right side when viewed from the observation side of the liquid crystal display element to emit light of red, green, and blue in synchronism with writing of the unit color image data of red, green, and blue for displaying the left-eye image, respectively, and (iii) causes one of the first and second light source units which is located on a left side when viewed from the observation side of the liquid crystal display element to emit light of red, green, and blue in synchronism with writing of the unit color image data of red, green, and blue for displaying the right-eye image, respectively.

15. A device according to claim 13, wherein a plurality of elongated convex lens portions are formed at the exit surface of the prism sheet of the surface light source to be parallel to said plurality of triangular elongated prism portions at the entrance surface.

16. A device according to claim 13, wherein the liquid crystal display element includes a homogeneous alignment liquid crystal display element in which a liquid crystal layer with liquid crystal molecules being initially aligned into a non-twisted, homogenous aligned state is sealed between a pair of substrates on which opposing electrodes are formed.

* * * * *